United States Patent [19]
> More
>
> [11] 3,959,031
> [45] May 25, 1976

[54] MOLTEN BASIC WELDING FLUXES LOW IN MANGANESE AND WITH LOW MOISTURE SENSITIVITY

[75] Inventor: Anton More, Burghausen, Germany

[73] Assignee: Wacker-Chemie GmbH, Munich, Germany

[22] Filed: Dec. 23, 1974

[21] Appl. No.: 535,381

[30] Foreign Application Priority Data
Dec. 28, 1973 Germany............................ 2365058
Jan. 3, 1974 Germany............................ 2400183

[52] U.S. Cl......................................... 148/26; 75/94
[51] Int. Cl.² ...................... B23K 35/34; C22B 9/10
[58] Field of Search............................ 148/26; 75/94

[56] References Cited
UNITED STATES PATENTS

| | | | |
|---|---|---|---|
| 2,697,770 | 12/1954 | Carpenter............................. | 148/26 |
| 2,755,211 | 7/1956 | Jackson ................................ | 148/26 |
| 2,759,084 | 8/1956 | Jackson ................................ | 148/26 |
| 2,868,681 | 1/1959 | Shrubsall .............................. | 148/26 |
| 3,201,292 | 8/1965 | Miltschitzky.......................... | 148/26 |
| 3,328,212 | 6/1967 | Coless................................... | 148/26 |
| 3,551,137 | 12/1970 | Bhat...................................... | 148/26 |

*Primary Examiner*—Peter D. Rosenberg
*Attorney, Agent, or Firm*—Allison C. Collard

[57] ABSTRACT

Molten basic welding fluxes low in manganese and having low moisture sensitivity composed as follows:

| | | |
|---|---|---|
| 10 – | 18 | % by weight of $SiO_2$ |
| 15 – | 25 | % by weight of $Al_2O_3$ |
| 0.1 – | 2.0 | % by weight of FeO and/or $Fe_2O_3$ |
| 0 – | 8 | % by weight of $TiO_2$ |
| 0 – | 3 | % by weight of MnO |
| 1 – | 8 | % by weight of CaO |
| 0 – | 4 | % by weight of BaO |
| 16 – | 33 | % by weight of MgO |
| 0 – | 2 | % by weight of $Na_2O$ and/or $K_2O$ |
| 0 – | 8 | % by weight of $ZrO_2$ |
| 15 – | 28 | % by weight of $CaF_2$ |
| 0 – | 1 | % by weight of $Cr_2O_3$ |
| 1 – | 8 | % by weight of CaO + BaO |
| 25 – | 37 | % by weight of CaO + BaO + MgO |
| 12 – | 22 | % by weight of $SiO_2$ + $TiO_2$. |

The invention also relates to a process of making the fluxes. The welding fluxes according to the invention have considerably improved welding properties.

8 Claims, No Drawings

MOLTEN BASIC WELDING FLUXES LOW IN MANGANESE AND WITH LOW MOISTURE SENSITIVITY

Basic melting fluxes for submerged arc welding have better mechanical properties than acidic welding fluxes and are therefore being used more and more frequently. However, with increasing alkalinity, the amount of alkalies and alkaline earth metals in the fluxes becomes higher and this leads, in general, to higher hygroscopicity.

Agglomerated fluxes made by mixing and drying or calcining of the finely ground starting components are particularly hygroscopic. That is due partly to the contents in water glass or binder, and partly to their large internal surface.

Sintered fluxes, too, have a large internal surface and when of appropriately basic character are hygroscopic as well. Moist welding fluxes introduce hydrogen into the goods to be welded, a fact which may lead to crack formation, especially in steel having high strength. In the case of such high strength steels, high notch impact strength is a very valuable property, which is exhibited by basic sintered or agglomorated fluxes. Up to now, the use of fluxes for welding hydrogen sensitive steels failed either because of the moisture content of fluxes, or they had to undergo cumbersome calcining before being used for welding.

Molten welding fluxes usually have a dense grain. Their surface is consequently smaller than that of agglomerated or sintered fluxes. For that reason, the absorption of moisture by them is lower than the one exhibited by agglomerated or sintered fluxes of the same composition. However, when the fluxes have too high a content in alkaline earth metals and/or alkalies, and too low a content in acidic or moisture-insensitive components, e.g. $SiO_2$, $TiO_2$ or $MnO$, they too will absorb moisture from the air.

It is the object of the invention to provide compositions of welding fluxes, which are as basic as possible and nevertheless of low moisture sensitivity. In addition it was desirable that the welding fluxes have good welding and seam forming properties. These fundamental requirements are very difficult to fulfill with basic fluxes low in manganese. That is the reason why hardly any progress was made in this field up to now.

It has now been found, according to this invention, that molten basic welding fluxes low in manganese, having low moisture sensitivity and good welding properties, can be provided with the following components:

| | | |
|---|---|---|
| 10 – | 18 | % by weight of $SiO_2$ |
| 15 – | 25 | % by weight of $Al_2O_3$ |
| 0.1 – | 2.0 | % by weight of $FeO$ and/or $Fe_2O_3$ |
| 0 – | 8 | % by weight of $TiO_2$ |
| 0 – | 3 | % by weight of $MnO$ |
| 1 – | 8 | % by weight of $CaO$ |
| 0 – | 4 | % by weight of $BaO$ |
| 16 – | 33 | % by weight of $MgO$ |
| 0 – | 2 | % by weight of $Na_2O$ and/or $K_2O$ |
| 0 – | 8 | % by weight of $ZrO_2$ |
| 15 – | 28 | % by weight of $CaF_2$ |
| 0 – | 1 | % by weight of $Cr_2O_3$ |
| 1 – | 8 | % by weight of $CaO + BaO$ |
| 25 – | 37 | % by weight of $CaO + BaO + MgO$ |
| 12 – | 22 | % by weight of $SiO_2 + TiO_2$. |

Especially good are the following compositions:

| | | |
|---|---|---|
| 12 – | 17 | % by weight of $SiO_2$ |
| 16 – | 23 | % by weight of $Al_2O_3$ |
| 0.1 – | 1.0 | % by weight of $FeO$ and/or $Fe_2O_3$ |
| 2 – | 6 | % by weight of $TiO_2$ |
| 0 – | 2 | % by weight of $MnO$ |
| 1 – | 6 | % by weight of $CaO$ |
| 0 – | 1 | % by weight of $BaO$ |
| 18 – | 31 | % by weight of $MgO$ |
| 17 – | 26 | % by weight of $CaF_2$ |
| 0 – | 1 | % by weight of $Cr_2O_3$ |
| 0.1 – | 1.0 | % by weight of $Na_2O$ and/or $K_2O$ |
| 2 – | 6 | % by weight of $ZrO_2$ |
| 1 – | 6 | % by weight of $CaO + BaO$ |
| 26 – | 35 | % by weight of $CaO + BaO + MgO$ |
| 12 – | 22 | % by weight of $SiO_2 + TiO_2$. |

The compositions according to the invention have good seam forming properties, but the welding results with automatic welders having a low open-circuit voltage are in a few cases fluctuating. In some cases many good welds will be produced but then useless welds will for no apparent reason be produced with the same fluxes under identical welding conditions.

Surprisingly, it is possible to stabilize the welding properties to such a degree that repeated weldings will always result in good seam formation, when a very small addition of some hundredths per cent is made of up to maximally 1.5% of chlorides.

Preferably, the alkali chlorides $NaCl$ and/or $KCl$, or alkaline earth chlorides e.g. $CaCl_2$ and/or $BaCl_2$ and/or $SrCl_2$ and/or $MgCl_2$ are used.

Good results were obtained with welding fluxes containing 0.02 – 0.6% by weight of alkali chlorides or 0.02 – 1.5% by weight of alkaline earth chlorides. Particularly, welding fluxes with constantly satisfactory welding properties are obtained by use of 0.02 – 0.6% by weight of mixtures of alkali and alkaline earth chlorides.

Another unexpected effect was obtained by pouring into water melts of welding fluxes of the compositions according to the invention heated to about 1700°C. In the preparation of moisture sensitive welding fluxes, it is the usual practice to avoid any contact with water during the entire production process. The melts are poured into iron tanks or troughs and after cooling, the molten mass is crushed or otherwise disintegrated to the desired grain size. In spite of the mentioned operation, welding fluxes of the compositions according to the invention will absorb up to 0.02% by weight of $H_2O$ (determined at 650°C.) after having been stored in air for a considerable length of time.

Completely surprising and contrary to general experience is the fact that by disintegrating the molten masses of welding fluxes by means of a jet of water, and with subsequent drying of the granulate, welding fluxes were obtained which upon storing in air for a considerable length of time absorb only half the amount of moisture than the fluxes cooled on the iron tanks and subsequently disintegrated.

Similar reductions in absorption of moisture by welding fluxes stored in air according to the invention are brought about by pulverizing melts of the fluxes by means of jets of air and/or vapor, or by means of rotating plates.

The basic welding fluxes according to the invention made as described are advantageous in other uses of the welding art than submerged arc welding, because of their low moisture sensitivity and their good welding characteristics.

The welding fluxes may also be used to advantage in the production of shell masses for electrodes, or as fillers for tubular wire. The percentage to be used in shell masses for electrodes or for fillers of tubular wire depends on the desired final composition of the said articles.

It will be obvious to those skilled in the art that other changes and variations can be made in carrying out the present invention without departing from the spirit and scope thereof as defined in the appended claims.

What is claimed is:

1. Molten basic welding fluxes low in manganese with low moisture sensitivity consisting essentially of the following components:

```
10  -  18%  by weight of SiO₂
15  -  25%  by weight of Al₂O₃
0.1 -  2.0% by weight of at least one member
of the group consisting of FeO and Fe₂O₃
 0  -   8%  by weight of TiO₂
 0  -   3%  by weight of MnO
 1  -   8%  by weight of CaO
 0  -   4%  by weight of BaO
16  -  33%  by weight of MgO
 0  -   2%  by weight of at least one member
of the group consisting of Na₂O and K₂O
 0  -   8%  by weight of ZrO₂
15  -  28%  by weight of CaF₂
 0  -   1%  by weight of Cr₂O₃
 1  -   8%  by weight of CaO + BaO
25  -  37%  by weight of CaO + BaO + MgO
12  -  22%  by weight of SiO₂ + TiO₂.
```

2. Molten basic welding fluxes according to claim 1, consisting essentially of the following components:

```
12  -  17%  by weight of SiO₂
16  -  23%  by weight of Al₂O₃
0.1 -  1.0% by weight of at least one member
of the group consisting of FeO and Fe₂O₃
 2  -   6%  by weight of TiO₂
 0  -   2%  by weight of MnO
 1  -   6%  by weight of CaO
 0  -   1%  by weight of BaO
18  -  31%  by weight of MgO
17  -  26%  by weight of CaF₂
 0  -   1%  by weight of Cr₂O₃
0.1 -  1.0% by weight of at least one member
of the group consisting of Na₂O and K₂O
 2  -   6%  by weight of ZrO₂
 1  -   6%  by weight of CaO + BaO
26  -  35%  by weight of CaO + BaO + MgO
12  -  22%  by weight of SiO₂ + TiO₂.
```

3. Molten basic welding fluxes according to claim 1, containing in the composition 0.02 – 0.6% by weight of alkali chlorides.

4. Molten basic welding fluxes according to claim 1, containing in the composition 0.02 – 1.5% by weight of alkaline earth chlorides.

5. Molten basic welding fluxes according to claim 1, containing in the composition mixtures of alkali chlorides and alkaline earth chlorides of 0.02 – 0.6% by weight.

6. A process for making molten basic welding fluxes according to claim 1 wherein the component parts are heated to melting temperatures and contacted with a jet of water for pulverizing whereafter the granulate so formed is dried.

7. A process for making molten basic welding fluxes according to claim 1 wherein the component parts are heated to melting temperatures and atomized by means of a jet of compressed air or of vapor.

8. A process for making molten basic welding fluxes according to claim 1 wherein the component parts are heated to melting temperatures and atomized by rotating plates.

* * * * *